(12) United States Patent
Wong

(10) Patent No.: US 6,546,409 B1
(45) Date of Patent: Apr. 8, 2003

(54) DIGITAL PROCESSING

(75) Inventor: Kar Lik Wong, Berkshire (GB)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/328,519

(22) Filed: Jun. 9, 1999

(30) Foreign Application Priority Data

Jun. 10, 1998 (GB) ............................................. 9812509

(51) Int. Cl.[7] .................................................. G06F 7/52
(52) U.S. Cl. ....................................................... 708/655
(58) Field of Search ................................ 708/504, 650, 708/653, 655, 656

(56) References Cited

U.S. PATENT DOCUMENTS

| 5,016,210 A | * | 5/1991 | Sprague et al. | 708/655 |
| 5,097,435 A | * | 3/1992 | Takahashi | 708/655 |
| 5,574,677 A | * | 11/1996 | Cohen | 708/552 |
| 6,047,305 A | * | 4/2000 | Yano | 708/655 |

* cited by examiner

*Primary Examiner*—Chuong Dinh Ngo
(74) *Attorney, Agent, or Firm*—Westman, Champlin & Kelly

(57) ABSTRACT

A digital processor and method for performing mathematical division in which performance degradation is mitigated by avoiding left shift and append (14) on the output of an ALU using pre-shift and append (18, 22) of the feedback from the quotient and remainder storage element (R, Q).

15 Claims, 2 Drawing Sheets

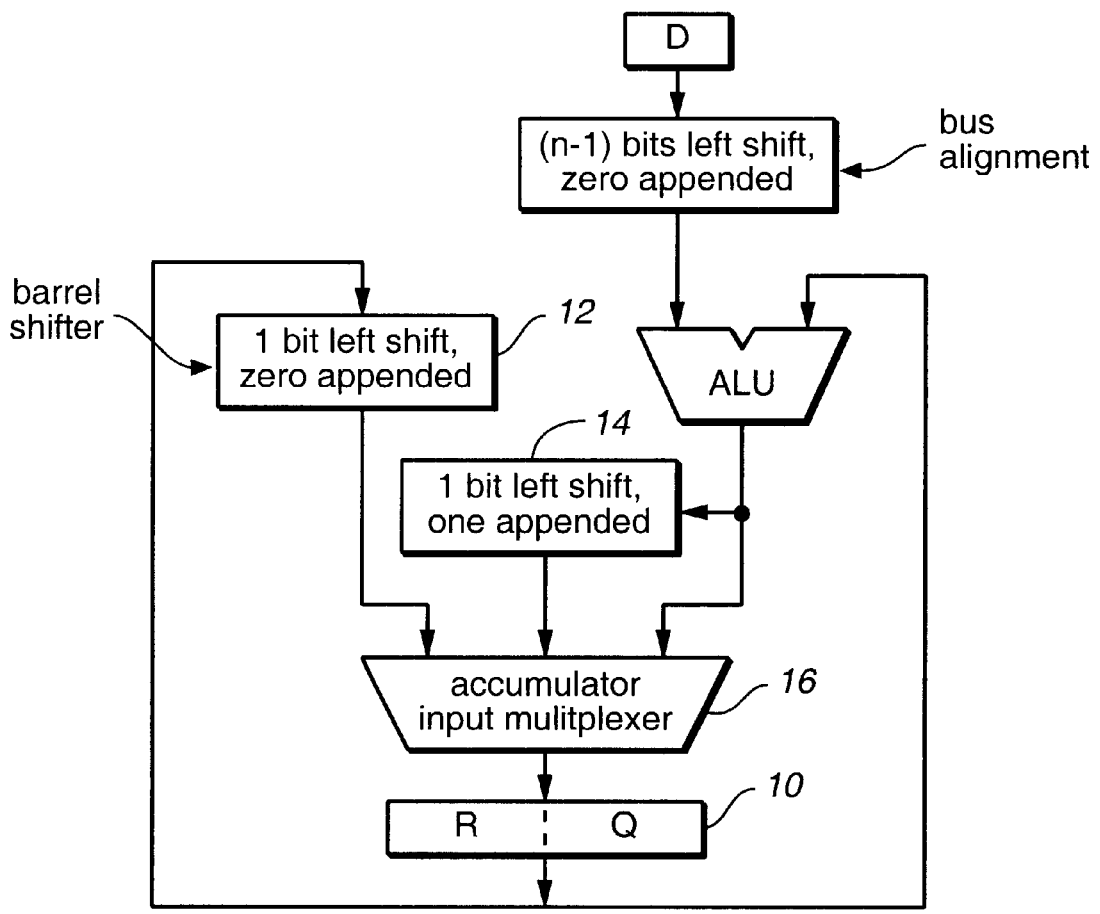
FIG._1
(PRIOR ART)

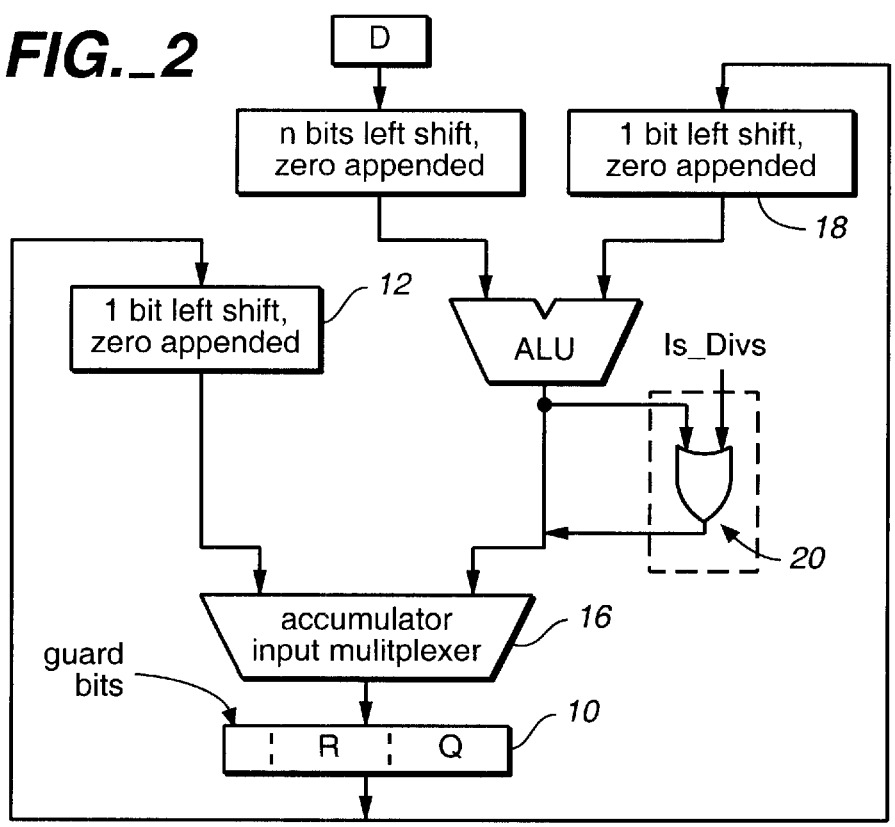
FIG._2
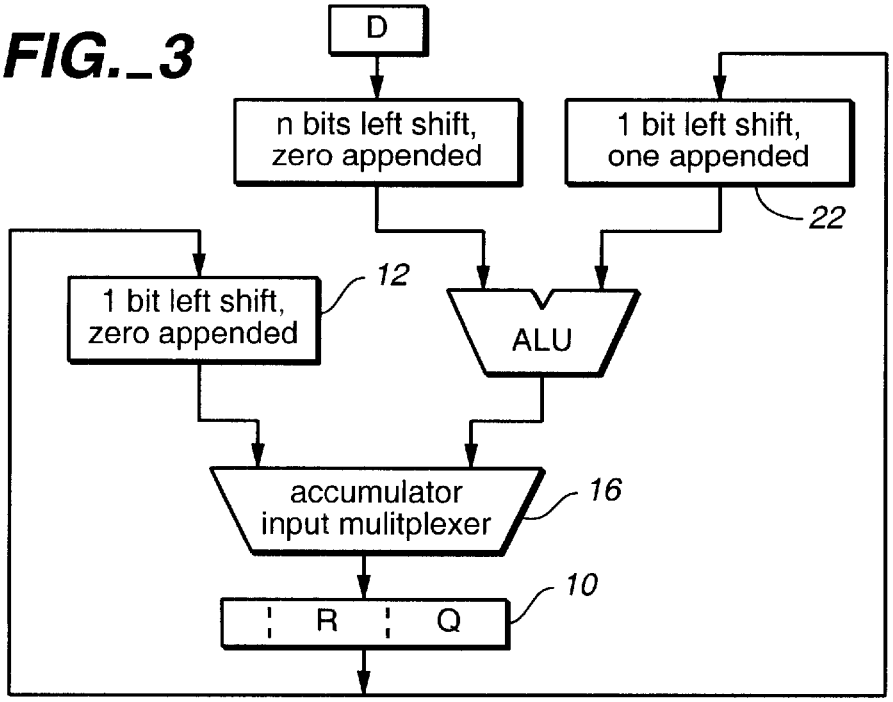
FIG._3

DIGITAL PROCESSING

BACKGROUND OF THE INVENTION

The present invention relates to digital processing in general and in particular to implementation of the mathematical division function. Often referred to as the division step instruction, this function is conventionally implemented in digital processors to perform integer division using dedicated hardware within the processor.

A conventional method and circuit for performing the so-called restoring division step operation for unsigned division can be understood from FIG. 1 of the accompanying drawings. The restoring division step is executed n times iteratively in order to perform an n-bit unsigned division. The n-bit storage elements R, Q and D are used to hold intermediate results after each iteration. Before the first iteration, R must be initialised to zero while Q and D must be loaded with the dividend and the divisor respectively. It is known, as indicated in FIG. 1, to use a wide datapath Arithmetic Logic Unit (ALU) so that the pair R and Q can be treated as one operand. This use of a wide datapath ALU is common in digital signal processors because it can support extended precision arithmetic. A single extended width accumulator 10 can be used to hold both operands R and Q. This combined operand can conveniently be referred to as (R, Q).

As will be understood from FIG. 1, each time the division step instruction is executed, D is first shifted left by (n−1) bits, zero appended and then subtracted from the R, Q pair. If the difference (T) is negative, the value of (R, Q) is shifted left by one and zero appended (block 12) before being loaded back to the registers R and Q. Otherwise, T is left-shifted by 1 and one appended (block 14) to produce the value (2T+1) and then loaded into (R, Q). After n iterations, the quotient and the remainder of the division will be found in Q and R respectively.

The arrangement shown in FIG. 1 makes use of existing functional units such as the barrel shifter (block 12) and the ALU. The (R, Q) pair can be a single wide accumulator that supports extended precision. It's input multiplexer (block 16) is provided to support parallel functional units. The shifter operating on D is needed as a bus alignment function to support increased precision internal datapath. The only extra hardware is the shifting function (block 14) on the ALU output.

A significant disadvantage of the arrangement shown in FIG. 1 is the extra delay incurred by the optional shifting of the ALU output. The shifting function can be implemented so as to produce a shift only for the division step instruction and so as to output the normal ALU output for all other instructions. As a consequence, the shifter delay is added directly to the ALU path. As an alternative, the shifting can be hardwired and produced as an extra input to the accumulator input multiplexer 16. The problem is then the extra delay caused by increased complexity of the multiplexer. As an example, a 2-input multiplexer is often much faster than a 3-input multiplexer of the same technology. With either of the known arrangements, extra delay is added to the ALU path. Since, particularly in a well balanced high performance processor, the ALU path is often the critical path within the processor, overall processor performance can be compromised.

SUMMARY OF THE INVENTION

According to a first aspect of the present invention there is provided a digital processor capable of performing mathematical n-bit division using n iterative steps, comprising: three storage elements one of which, the dividend element, is loaded with the dividend at the commencement of division; an arithmetic unit, a unit for left shifting and zero appending output from the dividend element which is connected to an output of the dividend element and which is connected to provide an input to the arithmetic unit; wherein the arithmetic unit is connected to supply an output to the two other storage elements an output from which is connected to be fed back to another input of the arithmetic unit, characterised by a left shift and append unit connected in the feedback from the two storage units to the arithmetic unit.

According to a second aspect of the present invention, in a digital processor for performing mathematical division using and having an arithmetic unit, a quotient storage element and a remainder storage element with feedback from the two storage elements to the arithmetic unit, there is provided a method of mitigating performance degradation characterised by the step of connecting a left shift and append unit in the feedback from the two storage elements to the arithmetic unit.

BRIEF DESCRIPTION OF THE DRAWINGS

Embodiments of the present invention will now be described by way of example only and with reference to the accompanying drawings in which:

FIG. 1 is a schematic block diagram illustrating the conventional implementation of the division step instruction, FIG. 2 is a schematic block diagram illustrating a first embodiment of the present invention, and FIG. 3 is a schematic block diagram illustrating a second embodiment of the present invention.

DETAILED DESCRIPTION OF ILLUSTRATIVE EMBODIMENTS

In FIGS. 2 and 3 the same reference signs are used to denote features which generally correspond to those indicated by the same signs in FIG. 1.

As illustrated in FIGS. 2 and 3, the present invention eliminates the shift operation on the ALU output by pre-shifting the (R, Q) pair in the feedback path to the ALU input.

In contract to the conventional arrangement shown in FIG. 1, the embodiment of the present invention illustrated in FIG. 2 omits the 1 bit left shift, one append block 14. Instead, a 1 bit left shift, zero append block 18 is connected in the feedback path from the (R, Q) pair to the ALU input. Additionally, instead of the n−1 bits left shift, zero append of FIG. 1 between the divisor storage element D and the ALU input there is provided an n-bits left shift, zero append. That is, both inputs to the ALU in FIG. 2 are shifted left by 1 bit compared with the FIG. 1 arrangement. The difference produced by the ALU in FIG. 2 is 2T, since left shifting by 1 is the same as multiplying by two in a binary system and (2A−2B)=2(A−B).

The pre-shifting of the (R, Q) pair shown in FIG. 2 ideally requires an ALU wider than the (R, Q) pair in order to guarantee that the extra left shifting does not result in overflow. However, it is common in conventional digital signal processors to provide an ALU of more than double the external data word width in order to implement guard bits against arithmetic overflow. Thus, the ALU requirement of FIG. 2 is not an additional overhead compared with conventional arrangements. Typically the guard bits would be stored with the (R, Q) pair, as indicated in FIG. 2.

Since the sign of T and 2T is the same, the sign bit of the ALU output can be used to select which value is to be loaded into the (R, Q) pair, as in the conventional arrangement. The extra pre-shifting on the (R, Q) pair does not incur additional delay because it is in parallel to the existing shifting operation performed on the output of the dividend store before it is input to the ALU. However, with the arrangement of FIG. 2 it may be necessary to coerce the least significant bit of the ALU result to 1, to produce the required value (2T+1) for the division step instruction. This can be achieved with the use of a logical OR gate 20, as shown within the chain-link defined block in FIG. 2. That is, the OR gate 20 is connected in parallel with the ALU output, receiving one input therefrom and it's other input (Is_Divs) from a source identifying whether or not a division instruction is being processed.

The OR gate 20 is added if necessary. However, its addition to the processor, can hinder the circuit layout and can complicate the datapath. Thus, a further improved arrangement has been devised. This further improved arrangement constitutes the second embodiment of the present invention and is illustrated in FIG. 3.

In the second embodiment, the possible need for the OR gate 20 of the first embodiment is avoided by replacing the 1 bit left shift, zero append block 18 by a 1 bit left shift, one append block 22. That is, a one rather than a zero is appended to the pre-shifted (R, Q) pair. Since D is zero appended after shifting by n bits, the difference (2T+1) is produced by the ALU directly. It is also to be noted that T$\geq$0 is equivalent to (2T+1)>0. Hence the sign bit of the ALU output can be used to control the accumulator input multiplexer as in the arrangements of both FIGS. 1 and 2. Thus, the second embodiment provides a particularly efficient use of the existing datapath while preserving it's simplicity.

As will be understood from the above, the present invention makes very efficient use of existing functional modules with little or no additional hardware requirements in implementing the division step instruction. It preserves the simplicity of the existing datapath and is especially suitable for commercial digital signal processors which use a wide ALU.

What is claimed is:

1. A digital processor for performing mathematical division and comprising an arithmetic unit, a quotient storage element, a remainder storage element and a feedback path from the quotient and remainder storage elements to the arithmetic unit, wherein the feedback path comprises a left shift and append unit.

2. A digital processor as claimed in claim 1, wherein the arithmetic unit is connected directly to an accumulator input multiplexer of the storage elements.

3. A digital processor as claimed in claim 1, wherein the left shift and append unit in the feedback path is a 1 bit left shift zero append unit.

4. A digital processor as claimed in claim 1, wherein the left shift and append unit in the feedback path is a 1 bit left shift one append unit.

5. A digital processor as claimed in claim 1 and further comprising a logical OR gate with one input connected in series with a least significant output of the ALU and another input connected to receive a signal identifying the presence of a division step instruction.

6. A digital processor as claimed in claim 1, wherein the processor is capable of performing n-bit division using n iterative steps and further comprises: a divisor storage element, to be loaded with a divisor at the commencement of division; and a unit for n bit left shifting and zero appending output from the divisor storage element; the unit for left shifting and zero appending output from the divisor storage element being connected between the divisor storage element and the arithmetic unit.

7. The digital processor of claim 1 and further comprising:

a further left shift and append unit;

a further feedback path from the quotient and remainder storage elements to the further left shift and append unit; and an accumulator input multiplexer having a first input coupled to the further left shift and append unit, a second input coupled to an output of the arithmetic unit and an output coupled to the quotient and remainder storage elements.

8. The digital processor of claim 7 wherein the first mentioned left shift and append unit and the further left shift and append unit both comprise a 1 bit left shift and zero append unit.

9. The digital processor of claim 7 wherein the first mentioned left shift and append unit comprises a 1 left shift and one append unit, and the further left shift and append unit comprises a 1 left shift and zero append unit.

10. In a digital processor for performing mathematical division and having an arithmetic unit, a quotient storage element, a remainder storage element and a feedback path from the quotient and remainder storage elements to the arithmetic unit, there is provided a method of mitigating performance degradation characterised by the step of performing a left shift and append on data from the quotient and remainder storage elements in the said feedback path.

11. A method as claimed in claim 10, and further comprising:

performing a left shift and zero append on data stored in the quotient and remainder storage elements to produce a shifted and zero appended value;

supplying the output of the arithmetic unit or the shifted and zero appended value to the quotient and remainder storage elements through an accumulator input multiplexer.

12. A method as claimed in claim 10, wherein the said step of left shift and append comprises a 1 bit left shift zero append.

13. A method as claimed in claim 10, wherein the said step of left shift and append comprises a 1 bit left shift one append unit.

14. A method as claimed in claim 10, further comprising the step of performing a logical OR operation on a least significant output of the ALU and a signal identifying the presence of a division step instruction.

15. A method as claimed in claim 10, for performing n-bit division using n iterative steps, and further comprising the steps of loading a divisor at the commencement of division into a divisor storage element and n bit left shifting and zero appending the output thereof prior to input thereof to the arithmetic unit.

* * * * *